United States Patent
Röding

(10) Patent No.: US 7,527,847 B2
(45) Date of Patent: May 5, 2009

(54) SINGLE-LAYER INTERIOR LINING ELEMENT

(75) Inventor: Hubert Röding, Ebrach (DE)

(73) Assignee: Ideal Automotive GmbH, Bamberg (DE)

( * ) Notice: Subject to any disclaimer, the term of this patent is extended or adjusted under 35 U.S.C. 154(b) by 0 days.

(21) Appl. No.: 11/290,614

(22) Filed: Nov. 30, 2005

(65) Prior Publication Data

US 2006/0275630 A1 Dec. 7, 2006

(30) Foreign Application Priority Data

Jun. 3, 2005 (DE) .................. 10 2005 025 681

(51) Int. Cl.
*B32B 3/02* (2006.01)
(52) U.S. Cl. .................. 428/92; 428/94; 428/95
(58) Field of Classification Search .............. 428/85, 428/92, 94, 95
See application file for complete search history.

(56) References Cited

U.S. PATENT DOCUMENTS

2007/0036979 A1 * 2/2007 Roding .................. 428/411.1

FOREIGN PATENT DOCUMENTS

| DE | 87 10 779.1 | 11/1987 |
|----|----|----|
| DE | 93 09 926.6 | 10/1993 |
| DE | 296 22 755 U 1 | 7/1997 |
| EP | 0 512 904 B1 | 11/1992 |
| EP | 1 325 845 A2 | 7/2003 |

* cited by examiner

*Primary Examiner*—Lynda Salvatore
(74) *Attorney, Agent, or Firm*—Setter Roche LLP

(57) ABSTRACT

The invention relates to an interior lining element, in particular for motor vehicles, with a decorative layer and a support layer, wherein an underlayer is provided, which is located opposite the decorative layer in the support layer, and the decorative layer and the support layer are embodied from yarn loops, or individual continuous narrow ribbons, as well as to a method for producing the interior lining element.

21 Claims, 1 Drawing Sheet

SINGLE-LAYER INTERIOR LINING ELEMENT

FIELD OF THE INVENTION

The invention relates to an inner lining element for motor vehicles, and a method for producing an inner lining element.

BACKGROUND OF THE INVENTION

Lining elements are employed, for example, in particular in connection with motor vehicles. The covering elements are textile materials in the area of the floor and sides of the passenger compartment of the motor vehicle. These covering elements are permanently fastened to the motor vehicle. In addition, there are interior lining elements intended to protect the actual textile covering elements, for example in the floor area (area of the feet). These interior lining elements are customarily arranged to be removable, sometimes also releasably fastened.

An interior lining element in the form of a floor mat is described, for example, in DE-GM 9309 926. Further interior lining elements are known, for example, from DE 296 22 755 U1, DE-GM87 10 779.1 and EP0 512 904 B1.

A further interior lining element is known from EP 1 325 845 A2. This interior lining element has a decorative layer at the top, a hot-melt adhesive layer, and underneath that a slide-blocking underlayer. The melt-adhesive layer connects the underlayer and the decorative layer. The decorative layer consists of a thermoplastic material, it preferably is a tufted velour material, a tufted loop fabric or a pile needle-formed fabric. It can also be a foil, or a woven or knit material. The decorative layer can be designed to be single layer or multi-layer. This is incidentally known. Pinning or tufting a support material is a customary technical method. In the course of pinning or tufting, continuous yarns, filaments or narrow ribbons are needled in loops through the support material. Subsequently the loops on the underside are cut open, in the course of which the projecting pile ends are created. The pile ends of the cut pile project downward and dig into the covering element.

The melt layer consists of polyolefin. The slide-blocking underlayer is formed by a support material and cut pile. The cut pile has been applied by needles to the support material, i.e. is tufted in. The support material is a non-woven, woven or knit material which, for increasing its stability, can be thermally bound, i.e. thermo-bonded. The mass per unit area of this layer is cited as being 30 to 250 g/m², and in particular 50 to 130 g/m².

OBJECT AND SUMMARY OF THE INVENTION

It is the object of the invention to embody an interior lining element, in particular for motor vehicles, in such a way that it can be produced more simply and rapidly, is lighter as a whole, and appears to be thinner.

This object is attained by means of an interior lining element having the characteristics of claim 1. Further embodiments are described in the dependent claims.

An interior lining element in accordance with the invention has only a single support layer, which has velour on the top and an anti-sliding layer on the underside, which has been tufted in. In this case the velour layer, or decorative layer, and the anti-sliding tufted layer are tufted into the support layer in one work cycle. This takes place here in such a way that the tufts created by tufting are arranged to lie next to each other, so that the opposite tufting from the top and the underside is not affected and in particular is not visible.

The support layer customarily consists of a nonwoven support material, in particular a spunbonded fabric, but can also consist of a woven material, a knit material, a needle-punched web, and even of very tight-knit fabric.

In connection with the invention it is of advantage to create a very thin, and therefore light and also easily deformable interior lining element, which protects covering elements in motor vehicles against wear and dirt, and in the process is slide-resistant.

The invention will be explained by way of a drawing.

BRIEF DESCRIPTION OF THE DRAWING

The single drawing FIGURE here shows a single-layer interior lining element in accordance with the invention in a greatly schematized cross-sectional view.

DETAILED DESCRIPTION OF THE PREFERRED EMBODIMENT

Figure 1:
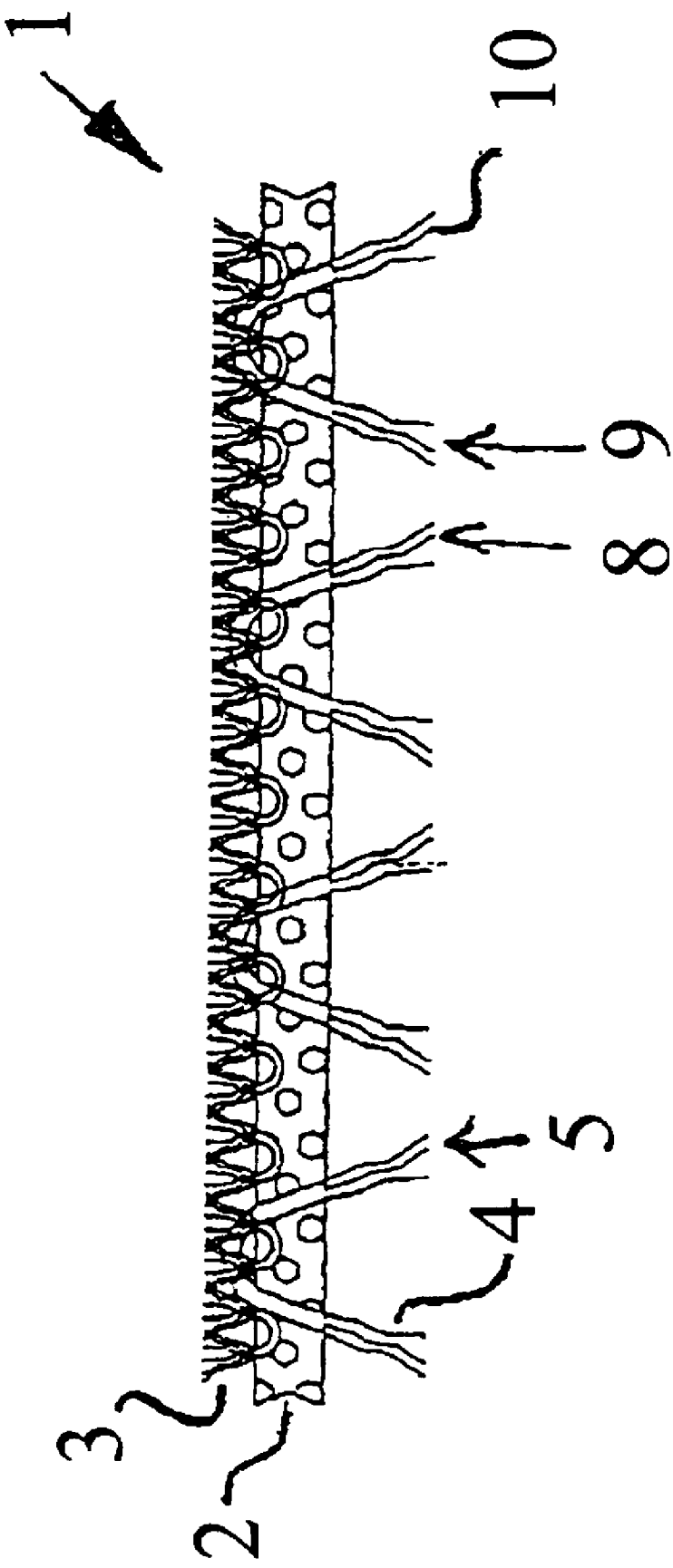

The interior lining element 1 in accordance with the invention has a support layer 2. The support layer 2 is a textile support 2, which for example is made of a nonwoven material, such as a spunbonded fabric or needle-punched web. The support layer 2 can furthermore also be made of knit materials, woven materials or tight-knit materials. On its top, the support layer 2 has a decorative layer 3. The decorative layer is made of a thermoplastic material in particular. The decorative layer 3 preferably consists of tufted velour, a tufted loop fabric or a pile needle-formed fabric. The decorative layer 3 can be designed as a single layer or multi-layered, such as is known. In particular, the decorative layer 3 is a velour layer tufted into the support layer 2.

An underlayer 4 is provided underneath the support layer 2, i.e. is located opposite the decorative layer 3 and on the side of the support layer 2 facing away from the decorative layer 3. For producing the underlayer 4, the support layer 2 is needled with continuous yarn or continuous narrow ribbons by means of a tufting velour method, and the loops of the continuous material being created at the underside in the course of tufting are cut open, so that a cut pile 6 is created.

The support layer 2 and, if desired, the decorative layer 3, as well as the underlayer 4, may consist of a thermoplastic material, in particular polypropylene, polyester, copolyester, polyamide, or of a mixture of these materials.

The continuous yarn used for producing the cut pile has a titer of 1000 to 6000 dtex, wherein a single filament (thread) of which the yarn consists has a titer of 17 to 300 dtex, in particular 44 to 57 dtex. The yarn can be a CF yarn, i.e. a yarn made of continuous filaments. A BCF yarn, i.e. a textured yarn made of continuous filaments, is preferably used. The cut filaments of such a textured yarn tend to spread open. By means of this it is achieved that, following the mentioned cutting open, the cut-open loops spread open, which improves the sliding resistance, because many spaced-apart pile ends are created.

The continuous narrow ribbons are preferably fibrillated, so that a multitude of pile ends is created following the mentioned cutting-open of the projecting loops. The continuous narrow ribbons can be fibrillated or not fibrillated, twined or not twined (twisted), within a titer range between 300 dtex and 10,000 dtex. The use of fibrillated continuous narrow ribbons for producing the cut pile 6 is advantageous, because roughened edges are created by the fibrillation, which aid the hold on the support layer 3. Because of tufting, the cut pile 6 is designed, for example, in such a way that the number of stitches in the support layer 2 is 8 to 50, preferably 25 to 40 stitches per 10 cm of length of the support layer 2. The distance between the rows of the loops of the cut pile 6 is, for example, dimensioned in such a way that 8 to 50 rows, preferably 25 to 40 rows per 10 cm of the width of the support 5 are created. In this way an approximately square pattern of projecting pile ends has been created on the surface of the underside of the lining element.

For stabilizing the support layers 2, the nonwoven, woven, or knit material constituting the support layer 2 can be thermally bound, i.e. thermo-bonded. The mass per unit area of the support layer is 30 to 300 g/m², and in particular 50 to 175 g/m².

For producing the single-layer lining element in accordance with the invention, first either the decorative layer 3 or the underlayer 4 is tufted into the support layer 2. This can also take place more or less simultaneously, wherein the entry points of the needles are selected in such a way that the two tufting patterns do not negatively affect each other. Thus, the decorative layer 3 can be tufted from the decorative layer side and simultaneously the underlayer 4 from the underlayer side. In the course of tufting, pile yarn is punched into a base weave by means of a needle, and the loop is caught on the oppositely located side by a gripper, so that loops result, which project past the base material in the needle entry direction, which are subsequently cut open with a knife fastened to the gripper. In the course of this, either the needle, or customarily the material is moved. For stabilizing the pile yarn on the support layer, a center coating, a so-called precoat, can be provided on the support layer 2 for tying up the pile yarn tightly. A synthetic latex material can be used as fixation or adhesive material, for example styrene butadiene latex, or natural latex.

In accordance with the invention it is possible to perform a two-stage fixation or thermo-bonding process. In the process, the precoat is pre-fixed after the first pile application process and is finally fixed after the second pile application process. Here, the fixation or adhesive material still has adhesive or plastic properties after the pre-fixation process and only sets or is fully cured during the final fixation.

Tufting of the lining element in accordance with the invention can in particular be performed in such a way that the gaps created during straight-line tufting, for example in the decorative layer 3, are used for performing the tufting of the underlayer within the spaces between the gaps.

In connection with an arrangement of the single-layer interior lining element on a covering element in a motor vehicle, the pile ends 10 of the individual yarn loops 8 or individual continuous narrow ribbons tufted into the support layer 2, which have been cut open, so that the cut pile 6 is created, enter into the textile structure of the covering element so that a connection is created in such a way that the interior lining element can hardly slide around, even if charged with forces parallel in connection to the plane of the covering element.

It is of advantage in connection with the invention that a single-layer interior lining element is created for motor vehicles in particular, which is light and can be simply and quickly produced, and moreover provides increased assurance against sliding. Furthermore, the interior lining element in accordance with the invention is insensitive to greater temperature changes. In contrast to dual- and multi-layered elements, it does not buckle under large temperature fluctuations. Moreover, the elements can be better adapted to existing contours.

What is claimed is:

1. An interior lining element, in particular for motor vehicles, comprising a decorative layer and only one single support layer, and an underlayer provided opposite the decorative layer in the support layer, wherein the decorative layer and the underlayer each comprise yarn loops or individual continuous narrow ribbons tufted into the single support layer, and the interior lining element includes no additional support layers.

2. The interior lining element in accordance with claim 1, wherein the support layer is a textile support layer.

3. The interior lining element in accordance with claim 2, wherein the support layer is made of a nonwoven material.

4. The interior lining element in accordance with claim 2, wherein the support layer is made of knit materials, woven materials or tight-knit materials.

5. The interior lining element in accordance with claim 1, wherein the decorative layer is made of a thermoplastic material.

6. The interior lining element in accordance with claim 1, wherein the decorative layer consists of tufted velour, a tufted loop fabric or a pile needle-formed fabric.

7. The interior lining element in accordance with claim 1, wherein the decorative layer is a velour layer tufted into the support layer.

8. The interior lining element in accordance with claim 1, wherein the underlayer is provided underneath the support layer and opposite the decorative layer and on the side of the support layer facing away from the decorative layer.

9. The interior lining element in accordance with claim 1, wherein the underlayer comprises a cut pile formed by needling the support layer with continuous yarn or continuous narrow ribbons using a tufting velour method, and cutting open loops of the continuous material created at the underside in the course of tufting.

10. The interior lining element in accordance with claim 1, wherein the support layer and/or the decorative layer and/or the underlayer are made of a thermoplastic material.

11. The interior lining element in accordance with claim 10, wherein the support layer and/or the decorative layer and/or the underlayer are made of polypropylene, polyester, copolyester, polyamide, or of a mixture of any of these materials.

12. The interior lining element in accordance with claim 1, wherein the continuous yarn used for producing the cut pile has a titer of 1000 to 6000 dtex, and a single filament of which the yarn consists has a titer of 17 to 300 dtex.

13. The interior lining element in accordance with claim 12, wherein a single filament of which the yarn consists has a titer of 44 to 57 dtex.

14. The interior lining element in accordance with claim 1, wherein the yarn is a continuous filament yarn.

15. The interior lining element in accordance with claim 1, wherein the yarn is a textured yarn made of continuous filaments (BCF yarn).

16. The interior lining element in accordance with claim 1, wherein the underlayer comprises cut filaments at the ends of textured yarn that are spread open.

17. The interior lining element in accordance with claim 1, wherein the continuous narrow ribbons are fibrillated, so that projecting loops have created a multitude of pile ends after they have been cut open.

18. The interior lining element in accordance with claim 1, wherein the continuous narrow ribbons have a titer of 300 dtex to 1000 dtex.

19. The interior lining element in accordance with claim 9, wherein the cut pile is tufted in such a way that the number of stitches in the support layer is 8 to 50 stitches per 10 cm of length of the support layer.

20. The interior lining element in accordance with claim 9, wherein a distance between rows of the loops of the cut pile is designed in such a way that 8 to 50 rows per 10 cm of width of the support are created.

21. The interior lining element in accordance with claim 1, wherein the nonwoven, the woven, or knit material constituting the support layer is thermally bound (thermo-bonded).

* * * * *